United States Patent [19]

Gilson et al.

[11] 4,077,017
[45] Feb. 28, 1978

[54] ULTRAVIOLET RADIATION INDUCED DISCHARGE LASER

[75] Inventors: Verle A. Gilson; Richard L. Schriever; James W. Shearer, all of Livermore, Calif.

[73] Assignee: The United States Government as represented by the U. S. Department of Energy, Washington, D.C.

[21] Appl. No.: 784,404

[22] Filed: Apr. 4, 1977

Related U.S. Application Data

[63] Continuation of Ser. No. 600,242, Jul. 30, 1975, which is a continuation of Ser. No. 315,043, Dec. 14, 1972, abandoned.

[51] Int. Cl.² .............................................. H01S 3/097
[52] U.S. Cl. ...................... 331/94.5 PE; 331/94.5 G
[58] Field of Search ................ 331/94.5; 313/197, 198

[56] References Cited

U.S. PATENT DOCUMENTS

| | | | |
|---|---|---|---|
| 2,405,071 | 7/1946 | Tonks | 313/35 |
| 3,351,870 | 11/1967 | Goldsmith et al. | 331/94.5 PE |
| 3,657,600 | 4/1972 | Wiegand, Jr. | 313/197 X |
| 3,886,479 | 5/1975 | Pearson | 331/94.5 PE |

OTHER PUBLICATIONS

Andreev, et al., Soviet Phys.-Tech. Phys., vol. 13, No. 6, (Dec. 1968), pp. 822-823.
Klass, Aviation, Wk. & Space Tech. (Jul. 19, 1971), pp. 48-51.
Novikov, et al., Chemical Abstracts, No. 70:62667b (1969), p. 393.

Primary Examiner—William L. Sikes
Attorney, Agent, or Firm—Dean E. Carlson; R. S. Gaither; L. E. Carnahan

[57] ABSTRACT

An ultraviolet radiation source associated with a suitable cathode-anode electrode structure, disposed in a gas-filled cavity of a high pressure pulsed laser, such as a transverse electric atmosphere (TEA) laser, to achieve free electron production in the gas by photoelectric interaction between ultraviolet radiation and the cathode prior to the gas-exciting cathode-to-anode electrical discharge, thereby providing volume ionization of the gas. The ultraviolet radiation is produced by a light source or by a spark discharge.

3 Claims, 6 Drawing Figures

ULTRAVIOLET RADIATION INDUCED DISCHARGE LASER

BACKGROUND OF THE INVENTION

The invention described herein was made in the course of, or under, Contract No. W-7405-ENG-48 with the United States Atomic Energy Commission.

This application is a continuation of application Ser. No. 600,242, filed July 30, 1975, which in turn is a continuation of application Ser. No. 315,043, filed Dec. 14, 1972, now abandoned.

This invention relates to gas lasers, particularly to high pressure pulsed lasers, and more particularly to a TEA lasser wherein preionization of the gas prior to the main discharge is achieved by a photoelectric interaction between ultraviolet radiation and the electrode structure.

Generally there are three means utilized in the prior known systems to provide ionization which stabilizes the main discharge in a laser system, there being: electron beams, double discharge, and ultraviolet light, with the latter functioning to produce cathode photo-emission, and volume ionization. The proponents of each type of system contends that that system provides the most uniform discharge. For example, an advantage of the double discharge process compared to electron beam pumping are the relatively low voltage requirements to achieve the main discharge while the electron beam system uses a very high electron acceleration voltage combined with high currents and thin windows.

The prior known double discharge process for exciting a volume of gas in a laser cavity, such as presently practiced with atmospheric pressure $CO_2$ lasers, involves the production of two consecutive electrical discharges between a suitable electrode arrangement disposed in the gas volume. The first, relatively low energetic discharge pre-ionizes the gas to produce therein a large supply of free electrons. The second, relatively high energetic discharge takes place along the uniform discharge path provided by the free electrons of the first discharge to thereby achieve the desired excitation of the gas.

It should be noted that it is conceivable that the first discharge in a double discharge system may already be providing ultraviolet (UV) as well as electrons, this being recently recognized.

Various electrode arrangements presently exist for implementing the double discharge process, these being the so-called "French" configuration, as exemplified by an article by R. Dummenchin et al., Sixth International Quantum Electronics Conference, Kyoto, Japan, 1970; the "Canadian" configuration, as exemplified by an article by A. K. Laflamme, Review of Scientific Instruments 41, 1578 (1970); and the "English" configuration, as exemplified by an article by H. M. Lamberton et al., Electron Letters 7, 141 (1971). In each of these electrode configurations, the free electrons, which provide the uniform discharge path for the main discharge, are produced by gas molecule collisions during the first of the two discharges.

SUMMARY OF THE INVENTION

The present invention is directed to a high pressure pulsed laser such as a transverse electric atmosphere (TEA) laser wherein preionization of the gas prior to the main discharge is achieved by a photoelectric interaction between the ultraviolet radiation of either a light source or spark discharge and the discharge electrode structure of the laser, thereby providing volume ionization of the gas.

Therefore, it is an object of this invention to provide an improved laser system providing volume ionization of the gaseous lasing media.

A further object of the invention is to provide the cathode-anode structure of a laser system with an ultraviolet radiation source to preionize the lasing gas prior to the main discharge.

Another object of the invention is to provide a means to achieve free electron production in the lasing gas media of a laser system.

Another object of the invention is to provide means to achieve free electron production in a lasing gas by photoelectric interaction between ultraviolet radiation and the cathode of a laser prior to the gas-emiting electrical discharge.

Another object of the invention is to provide an ultraviolet radiation source in association with a cathode-anode structure of a TEA laser to preionize the lasing gas prior to the main discharge between the cathode and anode.

Other objects of the invention will become readily apparent from the following description and accompanying drawings.

DESCRIPTION OF THE INVENTION

The present invention is of the TEA laser type although it is not limited to transverse discharges but a discharge device wherein electrons for the main discharge are generated by a photoelectric interaction between ultraviolet radiation and the discharge electrode structure of the device, the ultraviolet radiation being produced by either a light source or by a spark gap discharge. While the invention is generally similar to a double discharge type process, one of the discharges has been replaced with an ultraviolet source which is itself a different discharge.

Figure 1:
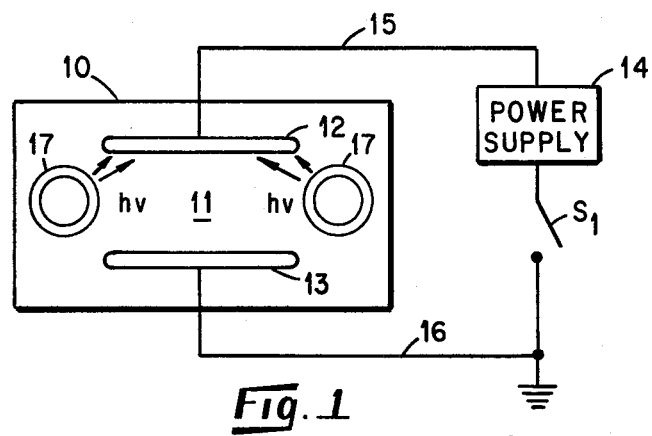
FIG. 1 is an end view schematically illustrating an embodiment of the invention utilizing xenon lamps.
Figure 2:
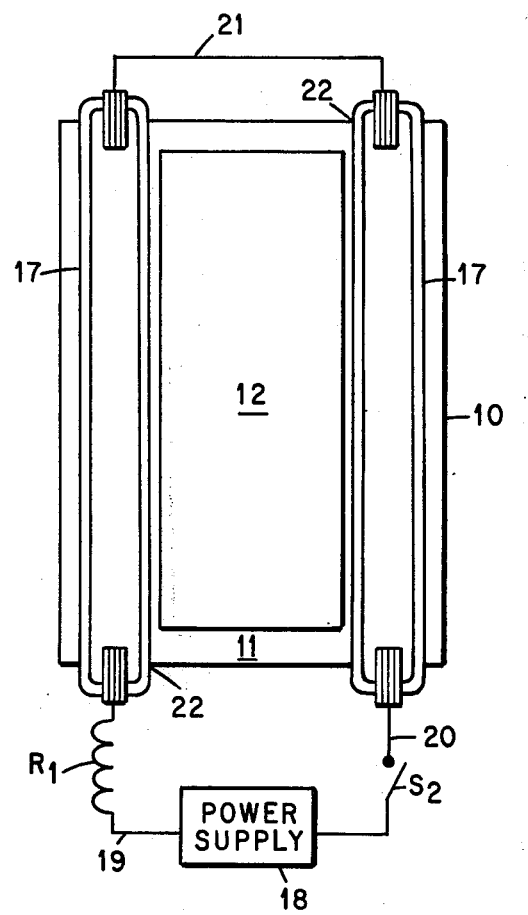
FIG. 2 is a plan view of the FIG. 1 embodiment.

Referring to the embodiment of the invention illustrated in FIGS. 1 and 2, the basic elements comprise a vessel or container 10 containing a gaseous lasing media 11, such as a mixture of $He/N_2/CO_2$ at atmospheric presure; a cathode 12 and an anode 13 spatially disposed in gaseous media 11 and connected electrically to a high voltage main discharge power supply 14, such as a capacitor bank, via leads 15 and 16 having a switch S, in lead 16; a plurality (two in this embodiment) of ultraviolet radiation or light sources 17, such as xenon-filled quartz discharge tubes, disposed in said vessel 10 near the cathode 12 and switchably connected at one end thereof (see FIG. 2) across a second power supply 18 via leads 19 and 20 with a switch $S_2$ operatively mounted in lead 20 and a resistor $R_1$ in lead 19, while a lead 21 connects the opposite ends of light sources 17 such that they are connected in series with power supply 18. Note that light sources 17 extend exteriorly of vessel 10 through apertures 22 such that the electrical connections therefore are not within the vessel, there being appropriate sealing means about the light sources 17 so as to prevent leakage of the gaseous lasing media 11 from vessel 10. While not shown, it is understood that the apparatus of FIGS. 1 and 2 can operate in either an amplifier mode by passing an appropriate light beam therethrough, or in an oscillator mode by positioning appropriate reflectors spaced from vessel 10 so as to provide an optical resonant cavity.

In operation of the discharge apparatus of FIGS. 1 and 2, switch $S_2$ is closed to activate tubes 17, whereupon the resulting ultraviolet radiation or light, indicated by the arrows and legend hv, from tubes 17 release photoelectrons into the gas volume 11 from cathode 12 by a photoelectric process, the details of which are well known. These photoelectrons provide the electron density necessary for establishing equilibrium conditions at the cathode and in the gas a uniform discharge between cathode 12 and anode 13 when subsequently switch $S_1$ is closed, as in the main discharge step of the double discharge process described above, producing the desired excitation of the gaseous lasing media 11 in vessel 10.

The ultraviolet (U.V.) light interaction in gas discharges is broken into two classes: (1) cathode photoemission effect near the cathode materials work function wavelength which normally is $\gtrsim 0.2$ m$\mu$, and (2) volume ionization effects which for one step ionization would normally be $\lesssim 0.2$ m$\mu$. These are two different effects and should be considered separately. The spark gap embodiment described hereinafter with respect to FIGS. 5 and 6 can produce both of the above effects, however, the envelope surrounding a flashlamp excitation (embodiments of FIGS. 1-4) limits the flashlamp to $> 0.2$ m$\mu$ emission and to cathode photo-emission. The electrons are generated at the cathode with the photoelectric effect. No ionizaton takes place until these electrons are accelerated to a velocity where collisions take place to cause the ionizations. The electrons drift into the volume from the cathode. The electrons and ions are generated in pairs in the volume by photoionization and these electrons are accelerated to cause collisions and more ion pairs.

Desired operating characteristics of the discharge device of FIGS. 1 and 2 depend upon the magnitude of the photoelectron production. Calculations show that the proper magnitude of photoelectron production by an ultraviolet light or radiation source can be achieved with a discharge device employing a cathode of a material such as copper, nickel, zinc or oxidium, which can withstand the severe conditions inside an atmospheric pressure discharge volume, yet have sufficiently high photoelectric efficiency.

Figure 3:
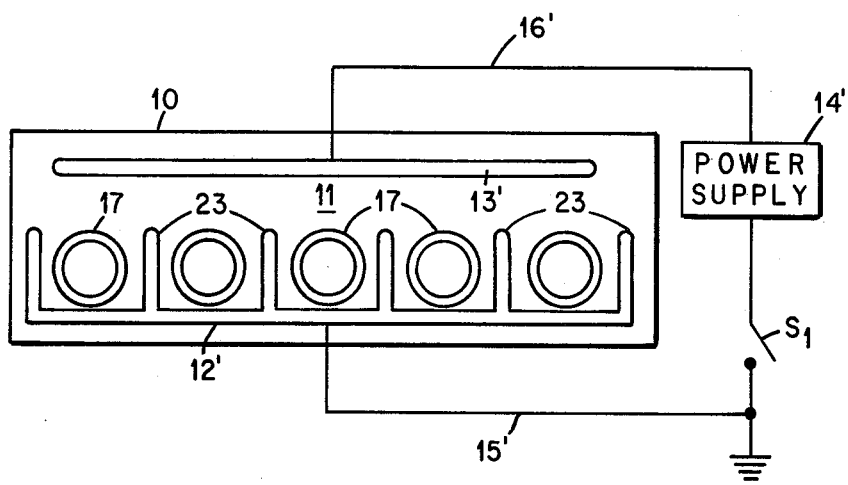
FIG. 3 is an end view schematically illustrating another xenon light embodiment of the invention.
Figure 4:
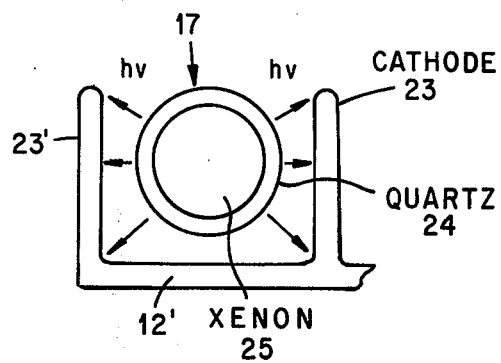
FIG. 4 is an enlarged view of the end portion of the cathode of the FIG. 3 embodiment.

FIGS. 3 and 4 illustrate how the so-called "French" double discharge electrode configuration can be modified according to the invention. Elements corresponding to those of the embodiment of FIGS. 1 and 2 will be given similar reference numerals. The modification comprises replacement of the trigger wire of the prior device which are located between extending blades or members 23 of cathode 12' with xenon-filled quartz discharge lamps 17. As seen more clearly in FIG. 4, the lamps 17 comprise a quartz outer shell 24 filled with xenon gas 25, whereby closure of an appropriate switch, such as switch $S_2$, which is connected to a power supply as in the FIG. 2 embodiment, activates tubes 17 thereby producing ultraviolet radiation directed toward the cathode 12' and the cathode blades 23 as indicated by the arrows and legend hv, as in the above description of the FIGS. 1 and 2 embodiment, whereby the resulting ultraviolet light or radiation releases photoelectrons into the gas volume 11 from the cathode 12' and blades 23 by a photoelectric process, thereby providing initial electron density for the gas-exciting main discharge between the cathode 12' (and blades 23 thereof) and anode 13'.

It is pointed out that the effect of photo electrons is to establish the electron-ion distributions in the cathode and in the gas necessary to initiate a self sustained discharge.

Multiphoton ionization by $A < 2000A$ light is possible and thus volume ionization by flashlamps is achievable. In addition, flashlamp U.V. sources are thought to provide volume ionization by multistep processes.

Figure 5:
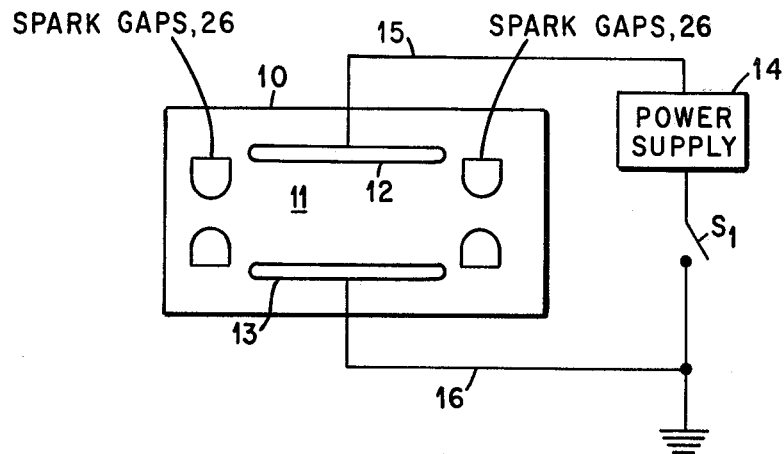
FIG. 5 is an end view schematically illustrating an embodiment of the invention utilizing spark gaps.
Figure 6:
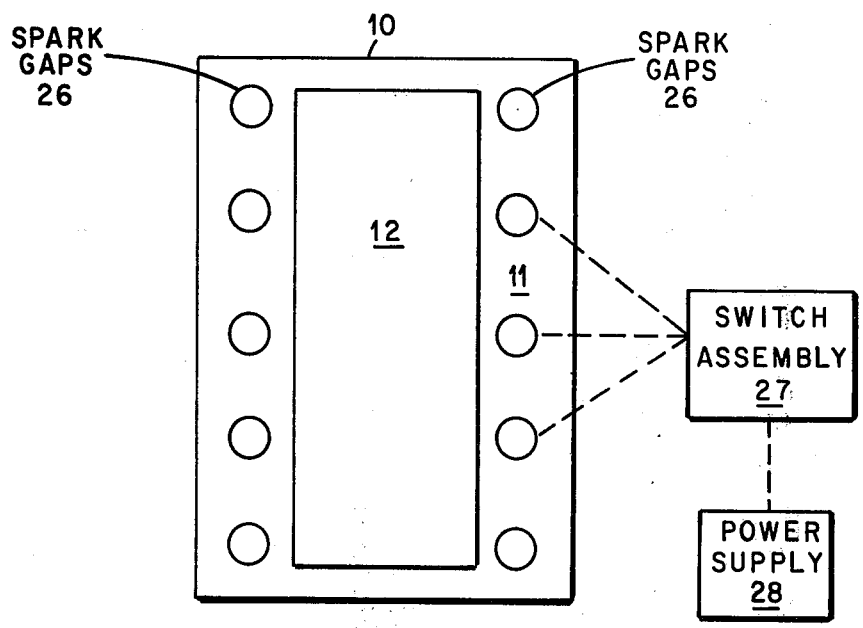
FIG. 6 is a plan view of the FIG. 5 embodiment.

While the embodiments of the invention illustrated in FIGS. 1-4 utilize xenon-filled quartz discharge lamps, other sources can be used to generate the ultraviolet radiation, such as by spark discharges inside the gas volume along side of the cathode, as illustrated by the embodiment of FIGS. 5 and 6. Components of the double discharge apparatus of FIGS. 5 and 6 similar to those of the embodiment of FIGS. 1 and 2 will be given corresponding reference numerals. This embodiment differs basically from the FIGS. 1 and 2 embodiment by substituting a plurality of spark gaps 26 for the lamps 17. While not shown in detail it is understood that the spark gaps 26 are each electrically connected via appropriate switching means to a suitable power supply, as indicated generally at 27 and 28, respectively, as are lamps 17 in FIG. 2, whereby activation of the switching means causes sparking across the spark gaps 26 thereby producing ultraviolet radiation which functions as described above with respect to the previously described embodiments.

The ultraviolet light or radiation generating arrangement of the FIGS. 5 and 6 embodiment raises the possibility of significant ultraviolet radiation in lower wavelength ranges ($\lambda \leq 0.2$ $\mu$m), even to the point where volume ionization of the gas (similar to electron beam-pumped discharges) becomes conceivable.

It has thus been shown that the present invention advances the state of the art of double discharge lasers by providing an ultraviolet radiation source in association with a suitable cathode-anode structure, disposed in a gas-filled laser cavity, to achieve free electron production in the gas by photoelectric interaction between the radiation source output and the cathode prior to the gas-exciting cathode-to-anode electrical discharge.

While particular embodiments of the invention have been illustrated and described, modifications will become apparent to those skilled in the art, and it is intended to cover in the appended claims all such modifications as come within the spirit and scope of the invention.

What we claim is:

1. In a discharge device having cathode means and anode means disposed in spaced relation in a contained gaseous lasing media, means for producing an electrical discharge between the cathode means and the anode means through the gaseous lasing media, and means for electrically connecting said electrical discharge producing means to the cathode means and the anode means, the improvement comprising: the cathode means being provided with a plurality of spaced extending blade-like means, means including a source of ultraviolet radiation positioned adjacent the cathode means for producing preionization of substantially the entire volume of the gaseous lasing media between the cathode means and the anode means prior to the gas-exciting cathode-to-anode electrical discharge by photoelectric interaction between ultraviolet radiation produced by said source and the cathode means, said source of ultraviolet radiation comprising a plurality of discharge lamp means producing ultraviolet light, said lamp means being positioned between said blade-like means of the cathode means, means separate from the gas-exciting cathode-to-anode electrical discharge producing means for activating said source of ultraviolet radiation prior to said gas-exciting cathode-to-anode electrical discharge, and means electrically separate from said first-mentioned electrically connecting means for electrically connecting said activating means to said source of ultraviolet radiation, said source of ultraviolet radiation producing an interaction in the gaseous lasing media composed of at least one effect comprised of the group consisting of cathode photoemission and volume ionization effects, whereby free electron production in the gaseous lasing media is achieved and an initial electron density is provided for the gaseous lasing media exciting electrical discharge between the cathode means and the anode means.

2. The device defined in claim 1, wherein said discharge lamp means comprises a plurality of xenon-filled quartz discharge tubes, and wherein said ultraviolet radiation source activating means includes means operatively connected to a power supply for activating said tubes, thereby generating said ultraviolet radiation.

3. The device defined in claim 1, wherein said means for producing an electrical discharge between said cathode means and said anode means comprises a power supply electrically connected in series arrangement to each of said cathode and anode means, and switch means mounted intermediate said power supply and cathode and anode means, whereby closing of said switch means causes said electrical discharge between said cathode means and said anode means.

* * * * *